United States Patent Office 2,744,107
Patented May 1, 1956

2,744,107

METHOD FOR THE PREPARATION OF LACTAMS BY THE REARRANGEMENT OF CYCLOALIPHATIC KETOXIMES

Harry Welz, Krefeld, Germany, assignor to Farbenfabriken Bayer Aktiengesellschaft, Leverkusen, Germany, a corporation of Germany No Drawing. Application October 28, 1952,
Serial No. 317,353

Claims priority, application Germany October 30, 1951

6 Claims. (Cl. 260—239.3)

In the re-arrangement of ketoximes, particularly ketoximes of cycloaliphatic hydrocarbons such as for instance cyclohexanone-, cyclopentanone-, methyl-cyclohexanone-, and cycloheptanone-oxime, to the corresponding cyclic lactams in the presence of the customary re-arrangement agents as for instance concentrated sulphuric acid or sulphur trioxide, large amounts of heat are generated which may easily cause superheating and in this way reactions of decomposition. It has already been proposed to carry out this re-arrangement in the presence of organic solvents such as hydrocarbons or chlorinated hydrocarbons as for instance saturated aliphatic hydrocarbons, cyclohexane, methylene chloride, propyl chloride, chloroform, or carbon tetrachloride, in order to avoid superheating. Whilst the aforesaid solvents are sufficiently stable to sulphuric acid under the conditions of the re-arrangement, their stability is insufficient when sulphur trioxide is used as a re-arrangement agent.

It has now been found that cyclic mono-nitro-hydrocarbons with a melting point of up to about 85° C. are particularly well suited when sulphur trioxide is used as re-arrangement agent. The characterized nitro-hydrocarbons excel in a remarkably high stability against sulphur trioxide and possess moreover the advantage of a particularly high dissolving power for the ketoxime and the acid amides formed therefrom by the re-arrangement, and also for sulphur trioxide. The high stability of the nitro-hydrocarbons to sulphur trioxide allows the application of a high concentration of this re-arrangement agent and in this manner a re-arrangement of the ketoxime as complete as possible.

Among the characterized cyclic mono-nitro-hydrocarbons which may be employed as solvent according to the present method particularly the following may be mentioned: aromatic mono-nitro-hydrocarbons such as nitrobenzene, o-, m-, and p-nitro-toluene, nitro-xylene, such as for instance 3-nitro-o-xylene, 4-nitro-o-xylene, and 4-nitro-m-xylene as well as α-mono-nitro-naphthalene, furthermore cycloaliphatic mono-nitro-compounds such as nitro-cyclopentane, 1,1-nitro-methylcyclopentane and nitro-cyclohexane.

Among the ketoximes of cycloaliphatic hydrocarbons which may be converted the following may be mentioned: methyl - cyclopropanone-oxime, methyl - cyclobutanone-oxime, cyclopentanone-oxime, 1-methyl-cyclopentanone-oxime-(2), 1-methyl-cyclopentanone-oxime-(3), 1-ethyl-cyclopentanone-oxime-(2), 1,1-dimethyl-cyclopentanone-oxime-(3), 1-methyl-2-ethyl-cyclopentanone-oxime-(5), 1,1,2-trimethyl-cyclopentanone-oxime-(5), 1,1,3-trimethyl-cyclopentanone-oxime-(2), 1,1,3-trimethyl-cyclopentanone-oxime-(3), cyclohexanone-oxime, 1-methyl-cyclohexanone-oxime-(3), 1-methyl-cyclohexanone-oxime-(3), 1-methyl-cyclohexanone-oxime-(4), 1,1-dimethyl-cyclohexanone-oxime-(3), 1,3-dimethyl-cyclohexanone-oxime-(5), 1,4-dimethyl-cyclohexanone-oxime-(2), ethyl-cyclohexanone-oxime, 1,1,3-trimethyl-cyclohexanone-oxime-(4), 1,1,3-trimethyl-cyclohexanone-oxime-(5), 1,1,4-trimethyl-cyclohexanone-oxime-(2), 1,1,4-trimethyl-cyclohexanone-oxime-(3), 1,2,4-trimethyl-cyclohexanone-oxime-(3), 1,2,4-trimethyl-cyclohexanone-oxime-(5) and heptanone-oxime.

The re-arrangement is preferably carried out in such a manner that a solution of the sulphur trioxide in the nitro compound is combined with a solution in the nitro compound of the ketoxime to be re-arranged in the process. The sulphur trioxide may be added to the nitro-hydrocarbon in the form of oleum. The sulphur trioxide may, however, also be dissolved directly in the solvents as gas due to its extremely high solubility in the characterized nitro-hydrocarbons. Most of the characterized hydrocarbons show such a high solubility for sulphur trioxide that it is possible to obtain for the present purpose of application sufficiently concentrated solutions by introducing contact oven gases coming from the production of sulphuric acid into the nitro-hydrocarbons.

It is not necessary to carry out the process at low temperatures of about 0° C. All temperatures from the melting point to the decomposition point of the reaction mixture may be used, that is up to about 50° C. Generally temperatures from about 10° to about 30° C. are preferred.

The working up of the reaction mixture may easily be effected by adding so much water that a solution of the formed acid amide in concentrated sulphuric acid results and by separating this solution from the mono-nitro-hydrocarbon. When neutralizing the acid solution the major part of the acid amide separates. The portion of the amide remaining in solution may be extracted with a nitro-hydrocarbon and the thus obtained solution recycled and used in a fresh reaction composition.

The following examples illustrate the invention, without being restricted thereto:

*Example 1*

Treat a mixture of 150 g. of nitrobenzene and 75 g. of 60 per cent oleum with a solution of 50 g. of cyclohexanone oxime in 200 ml. of nitrobenzene in the course of an hour, while stirring. The reaction temperature is kept at 25° C. while cooling. After the conversion is completed 30 g. of water are slowly added to the reaction mixture while cooling. Two layers are formed, the upper layer consists of nitrobenzene, the lower layer is a solution of caprolactam in sulphuric acid. The lower layer is neutralized in 250 g. of a 15 per cent solution of ammonia. The major part of the lactam with a moisture content of about 35 per cent separates in the form of an oil layer from the salt solution. The water is distilled off from the lactam layer whereby the nitrobenzene dissolved in the lactam goes over with the water vapour. The lactam is then distilled under vacuum. The lactam dissolved in the aqueous solution is extracted with nitrobenzene. The solution which contains 6 g. of lactam may be returned to a new composition. The total yield amounts to 45 g. of caprolactam.

*Example 2*

Treat a solution of 45 g. of sulphur trioxide in 150 g. of 1,1-nitro-methyl-cyclopentane with a solution of 50 g. of cyclohexanone-oxime in 2000 g. of 1,1-nitro-methyl-cyclopentane in the course of an hour, while stirring. The reaction temperature is kept at +10° C. while cooling. After the reaction is completed 30 g. of ice are added to the reaction mixture. A nitro-methyl-cyclopentane layer and a sulphuric acid layer are formed. The sulphuric acid layer is separated and neutralized with a 15 per cent solution of ammonia when the major part of the lactam is separated as an oil. The lactam layer is separated and the water distilled off. The lactam is purified by distillation under vacuum. The caprolactam dissolved in the aqueous solution is extracted by shaking with 100 g. of nitro-methyl-cyclopentane. The thus obtained solution may be added to a new composition. The yield of caprolactam amounts to 46 g.

*Example 3*

A solution of 250 g. of cyclohexanone oxime in 1000 g. of nitrobenzene is injected into a cooled iron vat of 1.5 litre capacity every hour and simultaneously 1.5 cub. m. of contact oven gases with a content of 6 per cent $SO_3$ are introduced at the bottom of the vat at about 25° C., evenly distributed over the area. The discharged reaction mixture is treated with 100 g. water per kg. reaction product. The acid solution is then separated from the nitrobenzene layer and neutralized with a 15 per cent solution of ammonia. The lactam separated from the aqueous solution is worked up as described in Example 1. The caprolactam dissolved in the aqueous solution is extracted with the nitrobenzene separated from the reaction product. The nitrobenzene solution is, after the addition of the corresponding amount of oxime, re-used in a reaction mixture. The yield per hour amounts to 236 g. caprolactam.

I claim:

1. A method for the preparation of lactams by the re-arrangement of ketoximes of cycloaliphatic hydrocarbons which comprises reacting a solution of sulphur trioxide in cyclic mononitro-hydrocarbons, having a melting point of up to about 65° C., with the oximes at temperatures ranging from the melting point to the decomposition point of the reaction mixture.

2. A method according to claim 1, in which the cyclic mononitro-hydrocarbon is an aromatic mononitro-hydrocarbon.

3. A method according to claim 2, in which the aromatic mononitro-hydrocarbon is nitrobenzene.

4. A method according to claim 1, in which the solution of the sulphur trioxide in a cyclic mononitro-hydrocarbon is obtained by introducing contact oven gases into the cyclic mononitro-hydrocarbon.

5. A method according to claim 1, in which the cyclic mononitro-hydrocarbon is 1,1-nitromethyl cyclopentane.

6. A method according to claim 1, in which the ketoxime of the cycloaliphatic hydrocarbon is cyclohexanonoxime.

References Cited in the file of this patent

UNITED STATES PATENTS

| | | |
|---|---|---|
| 2,249,177 | Schlack | July 15, 1941 |
| 2,573,374 | Wichterle | Oct. 30, 1951 |
| 2,634,269 | England | Apr. 7, 1953 |

FOREIGN PATENTS

| | | |
|---|---|---|
| 59,519 | Netherlands | June 16, 1947 |
| 894,102 | France | Dec. 14, 1944 |